(12) United States Patent
Xu et al.

(10) Patent No.: US 10,467,265 B2
(45) Date of Patent: Nov. 5, 2019

(54) METHOD FOR EXTRACTING ENTRIES FROM A DATABASE

(71) Applicant: Searchmetrics GmbH, Berlin (DE)

(72) Inventors: Fang Xu, Berlin (DE); Marcus Tober, Berlin (DE)

(73) Assignee: SEARCHMETRICS GMBH, Berlin (DE)

( * ) Notice: Subject to any disclaimer, the term of this patent is extended or adjusted under 35 U.S.C. 154(b) by 0 days.

(21) Appl. No.: 15/822,738

(22) Filed: Nov. 27, 2017

(65) Prior Publication Data

US 2018/0336268 A1    Nov. 22, 2018

Related U.S. Application Data (60) Provisional application No. 62/509,680, filed on May 22, 2017, provisional application No. 62/509,445, filed on May 22, 2017.

(51) Int. Cl.

| | |
|---|---|
| *G06F 16/33* | (2019.01) |
| *G06F 17/27* | (2006.01) |
| *G06K 9/62* | (2006.01) |
| *G06K 9/68* | (2006.01) |
| *G06F 16/43* | (2019.01) |

(52) U.S. Cl.
CPC ...... *G06F 16/3334* (2019.01); *G06F 16/3344* (2019.01); *G06F 16/3347* (2019.01); *G06F 17/278* (2013.01); *G06K 9/6215* (2013.01); *G06K 9/6878* (2013.01)

(58) Field of Classification Search
None
See application file for complete search history.

(56) References Cited

U.S. PATENT DOCUMENTS

| | | |
|---|---|---|
| 8,396,864 B1 | 3/2013 | Harinarayan et al. |
| 8,805,840 B1 | 8/2014 | Joshi et al. |
| 8,874,558 B1 | 10/2014 | He et al. |
| 8,892,549 B1 | 11/2014 | Thakur |

(Continued)

OTHER PUBLICATIONS

Dover, "The Evil Side of Google? Exploring Google's User Data Collection," Jun. 24, 2008 (Year: 2008).*

(Continued)

*Primary Examiner* — Usmaan Saeed
*Assistant Examiner* — Yu Zhao
(74) *Attorney, Agent, or Firm* — The Dobrusin Law Firm, P.C.; Daniela M. Thompson-Walters (57) ABSTRACT

The present teachings generally relate to a method for extracting one or more matched entries from a first database using a second database, including the steps of: identifying a plurality of second entities from the second database by filtering a plurality of entities of the second database according to one or more identification rules; inputting at least one keyword as a query to extract the one or more matched entries from the first database; linking the at least one keyword to one or more second entities according to one or more linking rules to define one or more linked second entities; matching the one or more linked second entities to one or more entries in the first database according to one or more matching rules to define the one or more matched entries; and extracting the one or more matched entries from the first database.

16 Claims, 4 Drawing Sheets

(56) References Cited

U.S. PATENT DOCUMENTS

| | | |
|---|---|---|
| 9,201,927 B1 | 12/2015 | Zhang |
| 9,213,748 B1 | 12/2015 | Matias |
| 2003/0018659 A1 | 1/2003 | Fuks et al. |
| 2003/0036942 A1 | 2/2003 | Wescott |
| 2005/0071328 A1* | 3/2005 | Lawrence ......... G06F 17/30867 |
| 2007/0043761 A1 | 2/2007 | Chim et al. |
| 2007/0233656 A1* | 10/2007 | Bunescu ............... G06F 17/278 |
| 2009/0083251 A1 | 3/2009 | Sahasrabudhe et al. |
| 2009/0234727 A1 | 9/2009 | Petty |
| 2009/0292677 A1 | 11/2009 | Kim |
| 2009/0292685 A1* | 11/2009 | Liu ................... G06F 17/30817 |
| 2010/0030770 A1 | 2/2010 | Cao |
| 2011/0029513 A1 | 2/2011 | Morris |
| 2011/0106895 A1 | 5/2011 | Ventilla |
| 2011/0258052 A1* | 10/2011 | Kakade .................. G06Q 30/02 705/14.69 |
| 2012/0131015 A1 | 5/2012 | Al Badrashiny et al. |
| 2012/0166414 A1 | 6/2012 | Decker et al. |
| 2013/0325779 A1 | 12/2013 | Shahshahani et al. |
| 2014/0108369 A1 | 4/2014 | Nijjer |
| 2014/0164345 A1 | 6/2014 | Connolly et al. |
| 2014/0164362 A1 | 6/2014 | Syed |
| 2014/0222819 A1 | 8/2014 | Dies |
| 2014/0229810 A1* | 8/2014 | Ramanathan ......... G06F 17/241 715/202 |
| 2014/0344261 A1* | 11/2014 | Navta ............... G06F 17/30864 707/723 |
| 2015/0039983 A1 | 2/2015 | Gibb et al. |
| 2015/0058712 A1 | 2/2015 | Berk et al. |
| 2015/0186526 A1 | 7/2015 | Rao |
| 2015/0293999 A1* | 10/2015 | Zhan ................... G06F 17/2241 707/723 |
| 2016/0041985 A1 | 2/2016 | Manterach et al. |
| 2016/0124944 A1 | 5/2016 | Andreoli et al. |
| 2016/0125087 A1 | 5/2016 | Mallah |

OTHER PUBLICATIONS

Co-pending U.S. Appl. No. 15/284,739, filed Oct. 4, 2016.
Co-pending U.S. Appl. No. 15/337,268, filed Oct. 28, 2016.
Moody, Chris. "A Word is Worth a Thousand Vectors." Stitch Fix Technology—Multithreaded. Mar. 11, 2015. Web. May 20, 2017. http://multithreaded.stitchfix.com/blog/2015/03/11/word-is-worth-a-thousand-vectors.
"Named-Entity Recognition." Wikiwand. Web. May 20, 2017. https://www.wikiwand.com/en/Named-entity_recognition.
Leskovec, Jure, et al. "3.5 Distance Measures." *Mining of Massive Datasets, Second Edition*, Cambridge University Press, 2014, p. 89.
Lin, Chin-Yew, et al. "3.4 Different Vector Similarity Measure Pruning Comparison." *Natural Language Understanding and Intelligent Applications*, Springer, 2016, p. 85.
U.S. Office Action for Co-pending U.S. Appl. No. 15/337,268, dated Mar. 9, 2017.
U.S. Office Action for Co-pending U.S. Appl. No. 15/337,268, dated Dec. 15, 2016.

* cited by examiner

METHOD FOR EXTRACTING ENTRIES FROM A DATABASE

FIELD

The present disclosure generally relates to a method for extracting entries from a database. More specifically, it allows relevant entries to be extracted from a database based on one or more keyword given as input.

BACKGROUND

Extraction of entries from databases is generally known and different algorithms have been suggested in the past. The general approach is to associate a key to each entry stored in the database and then retrieve a given entry when an inputted query corresponds to the key associated to the entry. For instance, the entry may be a text description of the Norton Motorcycles company and the key can be "Norton Motorcycles". When the user enters "Norton Motorcycles" as query, the description stored in the database is returned.

This general approach works well when there is a one-to-one correspondence between the query and the key. For instance, in a database storing order entries of several clients, the key could be a unique number associated to each client. Once a query is entered, corresponding to a unique number of a given client, the query is compared to each key until a corresponding key is identified. Once the corresponding key is identified, the entry associated to the key is extracted from the database and returned to the user. However, this approach does not work well when the key is generally related to the inputted query, but does not correspond in a one-to-one manner. This will be more easily understood by means of the following example.

A database from which the entry is to be extracted may be, for instance, a dictionary, where each entry in the database is associated to a key, for instance a string, and provides a description or explanation of the key. For instance, the key "motorcycle" may be associated to the entry "A moving vehicle with two wheels generally used for transportation of people".

When using a classic one-to-one correspondence approach, as described above, the user who wants to reach the description of what a "motorcycle" is would have to enter exactly the keyword "motorcycle" as a query. Entering "motorbike" would not return the intended entry. In some cases this can be solved by allowing the use of wildcards. For instance, the query "motor*", where the character "*" substitutes any given number of characters, would return the entry associated with the key "motorcycle". The approach using wildcards is however generally not ideal as in most cases it increases drastically the number of identified results, such that the user then has to manually select the relevant result.

A problem moreover arises when a user wants to know, for instance, what the keyword "Norton café racer" means, if the database only comprises an entry associated to the key "Norton motorcycle". In this case, assuming the user has no knowledge of what the Norton Motorcycle Company manufactures and what a "café racer" indicates in the field of motorcycles, it may be difficult for the user to find the relevant entry in the database. It is possible, for instance, that no entry in the database may correspond to the key "Norton café racer". However, the entry corresponding to "Norton motorcycle" may provide, as a description "A British motorcycle manufacturing company known in particular for manufacturing of sport motorcycles with retro style, known generally as café racers" which could help the user in understanding what "Norton café racer" means. Finding the entry "Norton motorcycle" may be tried by the use of wildcards, for instance by looking for "Norton café*", which wouldn't retrieve any entry, or "Norton*", which would. However, the user would have to manually try several possible combinations, which is not efficient. Moreover, it is possible that the database may comprise the following keys: "Norton Motorcycle", "Norton Edward", "Norton Antivirus" so that a search for "Norton*" would not yet return the specific entry that the user is looking for, since three different keys correspond to the query. Even further, in some cases, it would be desirable to identify the entry related to the key "Norton Motorcycle" by entering as a query the term "café racer" since, as described above, the term "café racer" is somehow related to the entry associated to the key "Norton motorcycle".

The present disclosure has been developed to solve one or more of the above-described problems.

SUMMARY

The present disclosure generally relies on the principle that a plurality of logical entities can be identified in a second database and those entities can be used to retrieve data from a first database. More specifically, by having a larger number of entities in the second database compared with the number of entries in the first database, the larger number of entities in the second database can be used to fine-tune the selection of the relevant entry from the first database. The use of an intermediate, second, database provides an unconventional approach for improving precision of identifying, extracting, and retrieving data from a first database.

The present disclosure relates to a method which may be useful for extracting one or more entries from a first database comprising the steps of: identifying a plurality of second entities from a second database; inputting at least one keyword; linking the at least one keyword to a linked second entity among the plurality of second entities; matching, in the first database, one or more entries based on the linked second entity; and extracting the matched one or more entries.

The present disclosure relates to a method for extracting one or more matched entries from a first database using a second database comprising the steps of: identifying a plurality of second entities from the second database by filtering a plurality of entities of the second database according to one or more identification rules; inputting at least one keyword as a query to extract the one or more matched entries from the first database; linking the at least one keyword to one or more second entities according to one or more linking rules to define one or more linked second entities; matching the one or more linked second entities to one or more entries in the first database according to one or more matching rules to define the one or more matched entries; and extracting the one or more matched entries from the first database.

The present disclosure relates to a method for extracting one or more matched entries from a first database using a second database comprising the steps of: providing a first database and a second database, each populated with a plurality of entities; based upon user input, generating a plurality of identified second entities by filtering the entities of the second database according to one or more identification rules; evaluating one or more keywords inputted by a user and the plurality of identified second entities according to one or more linking rules to filter the plurality of identified second entities and define a plurality of linked second entities; generating one or more matched entries by applying one or more matching rules to the plurality of linked second entities and matching with one or more entries of the first database; extracting the matched one or more entries; and employing the one or more matched entries in a proposed web site.

When a keyword, or more generally a string, is inputted as query for retrieving data from the first database, the keyword is first linked to one of the plurality of logical entities identified in the second database and the linked logical entity is subsequently used in order to extract information from the first database, such as a dictionary or similar fact-containing database.

The use of an intermediate database, namely the second database, increases the precision in the matching of the inputted keyword to the entries of the first database. Moreover, the fine-tuning of the search achieved thanks to the presence of the second database allows, in some embodiments, to extract only the most relevant parts of the entry selected from the first database.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Several kinds of websites need to be constantly updated in order to attract clients or visitors. This is the case, for instance, of news web sites, which regularly need to create new content to make sure customers regularly browse the web site, thereby creating revenues, for instance through paid advertisement space. It could also be the case, for instance, of retail websites, which regularly need to update the items on offer.

The person in charge of creating or updating the content of a website is generally referred to as content creator. When the content creator needs to create or update a webpage, for instance for a new piece of news or a new article for sale, the content creator is usually faced with the problem deciding what content should be included in the page in order to attract traffic. As an example, if the new page relates to a new "café racer" motorcycle model from a given company and the content creator has little knowledge about motorcycles, or what a "café racer" is at all, the content creator is faced with the problem of what to write which may be of interest to potential clients. This may happen, for instance, for large retailers where a few content creators have to regularly create or update pages related to thousands of different articles and cannot be expected to be an expert in each field. Furthermore, even if the content creator is an expert in the field concerning the given item, it is difficult to estimate which content will generate a high visibility in the Internet. Do the users looking for that specific motorcycle care more about performances, mileage, reliability, style? Such questions are rather difficult to answer for the content creator.

Software has been developed for allowing a content creator to input one or more keywords related to a concept, in the given example for instance "motorcycle" and "café-racer", and be provided with a list of keywords relevant to that concepts and ensuring a high visibility on search engines. The working principle of such software is not relevant for the present teachings and will therefore not be further discussed. An example of such software is the "Searchmetrics Suite" distributed by Searchmetrics GmbH, Greifswalder Straße 212, 10405 Berlin, Germany.

As an example, when using such software, the content creator who has to create a new page for the new café racer model may input the keywords "café racer" and "motorcycle" into said software and by provided with the following list of suggested relevant keywords, which are chosen by the software for ensuring high visibility: "café-racer", "Norton", "tradition", "Isle of Man TT". The content creator can, based on such keywords, gather inspiration on what content may generate a high visibility on search engines and, therefore, a higher traffic on the website and increased revenues.

In this particular example, it is possible that the content creator may not know what the keywords "café racer" and "Norton" mean. This prevents the content creator to use those keywords effectively when creating the content. One possible solution would be to search for those keywords in the Internet. However, this would be time-consuming and inefficient. Moreover, when searching the keyword "Norton" online the content creator may retrieve results relating to "Norton motorcycles", which is the relevant result, but also related to "Norton antivirus", a software company, or "Norton Edward", an actor, which are not relevant. Those three results, namely "Norton motorcycle", "Norton antivirus" company and "Norton Edward" are ambiguous when only the keyword "Norton" is used as a search key. Since the user looking for the meaning of "Norton" does not know what "Norton" means, such ambiguity may further slowdown the search. Even if the software has access to a database comprising entries associated with the keys "Norton motorcycle", "Norton antivirus" and "Norton Edward", a method for selecting which entry should be extracted from the database and shown to the user is lacking.

An embodiment of the teachings herein can solve this problem. In particular, some embodiments of the teachings herein allow the extraction of relevant entries, in the example above entries concerning the entity "Norton motorcycle", based on at least one inputted keyword, in the example above "Norton". Moreover, in some cases, some embodiments can also identify entries concerning the entity "café racer" based on a related keyword such as, for instance, "Norton". Still further, some embodiments allow the extraction of the most relevant entries associated to a given entity, in case the entity is associated to a plurality of entries, and the user only desires to be shown the most relevant ones.

It will be however clear that the teachings herein are not limited to this specific example or this specific field of application. More generally, the embodiment allows extraction of relevant entries from a first database based on at least one keyword, where the relevant entries are logically associated to the keyword.

The teachings herein refer to a plurality of databases. The databases may include a first database, a second database, or both. One or more databases may function to store information, such as a large collection of data; link entries of data to other entries of data within the same and/or a different database; communicate with one or more other databases; or any combination thereof. The databases may include any type of database able to store digital information. The digital information may be stored within one or more databases in any suitable form using any suitable database management system (DBMS). Exemplary storage forms include relational databases (e.g., row-oriented, column-oriented), correlation databases, ordered/unordered flat files, structured files, the like, or any combination thereof. The databases may be located within or be part of hardware, software, or both. One or more databases may be stored on a same or different hardware and/or software as one or more other databases. The databases may be located within one or more non-transient storage devices. One or more databases may be located in a same or different non-transient storage device as one or more other databases. A non-transient storage device may include one or more physical servers, virtual servers, or a combination of both. One or more servers may include one or more local servers, remote servers, or both. A non-transient storage device may include one or more memory storage devices. One or more memory storage devices may include one or more hard drives (e.g., hard drive memory), chips (e.g., Random Access Memory "RAM"), discs, flash drives, memory cards, the like, or any combination thereof.

The plurality of databases may each store one or more entries of data. The one or more entries of data may be referred to as entries. One or more entries may include a single entry or a plurality of entries. The one or more entries may comprise one more strings, vectors, numbers, Booleans, arrays, images, videos, the like, or any combination thereof. One or more strings may include one or more textual characters or be a text file. A vector may be a vector representation of one or more other types of entries. For example, a vector may be a vector representation of one or more strings. One or more entries may be associated with one or more keys. A plurality of entries in a database may share a common key. One or more entries, keys, or both may form one or more entities. One or more entities may include a single entity or a plurality of entities. An entity may include one or more entries and the one or more keys associated with the one or more entries. For example, a plurality of entries associated with a common key may form an entity. One or more databases may be provided to a customer unpopulated, partially populated, or completely populated. A user may populate one or more databases with one or more entries related to a user's own data. For example, a first database may be populated with a user's own data. A user's own data may be any collection of information useful to the client or for sharing with other individuals. Examples of a user's own data may include goods and/or service information, client information, or any other collection of knowledge which may be digitally stored. One or more databases may include one or more entries retrieved from one or more other sources. A user may initiate population of one or more databases with entries from one or more other sources and/or a database may already be partially or fully populated with entries from one or more other sources. One or more other sources may include one or more digital libraries, Internet-based encyclopedias, and/or the like. An exemplary Internet-based encyclopedia is Wikipedia®. For example, a second database may retrieve a large volume of text from the Internet. A large volume of text may be defined as 20 GB or greater, 30 GB or greater, or even 40 GB or greater. A large volume of text may be 120 PB or less, 100 PB or less, or even 100 TB or less. A database which may retrieve one or more entries from the one or more sources may be the actual source, may be a permanent copy of all or a portion of the source, or may even be a temporary copy of all or a portion of the source.

One or more databases may be in communication with one or more other databases, software, hardware, processors, interfaces, and/or the like via one or more networks and/or connections. One or more networks may include one or more local area networks (LAN), wide area networks (WAN), Internet, the like, or any combination thereof. One or more connections may include one or more database connections. One or more database connections may allow communication to and from a non-transient storage device. For example, a database connection may allow for sending commands and receiving replies from the non-transient storage device.

The one or more databases may be in communication with one or more user interfaces. The one or more user interfaces may function to allow a user, such as a content creator, to input one or more data entries into one or more databases; trigger one or more rules to trigger a method for identifying, linking, matching, and/or extracting one or more data entries from one or more databases; allow a user to see one or more outputs from one or more interfaces; the like; or any combination thereof. One or more user interfaces may include any suitable interface for a user to input data, receive output data, or both from one or more databases. One or more databases may include one or more graphical user interfaces, web-based user interfaces, touch user interfaces, hardware interfaces, search interfaces, command-line interface, voice user interface, zero-input interfaces, the like, or any combination thereof.

The one or more databases may be in communication with and/or part of one or more processors. The one or more processors may function to process data, apply on or more rules, evaluate data against one or more rules, or any combination thereof. Processing data may include receiving, transforming, outputting, executing, the like, or any combination thereof. One or more processors may be part of one or more hardware, software, systems, or any combination thereof. One or more hardware processors may include one or more central processing units, multi-core processors, front-end processors, the like, or any combination thereof. One or more software processors may include one or more word processors, documents processors, the like, or any combination thereof. One or more system processors may include one or more information processors, the like, or a combination thereof. The one or more processors may be located within a same or different non-transient storage device as one or more databases.

Figure 1:
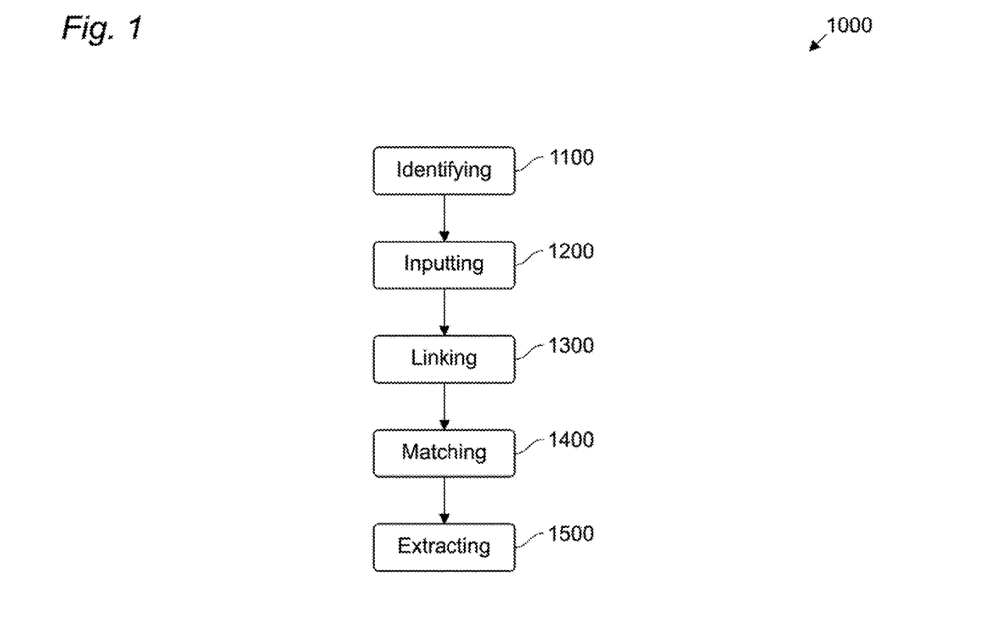
FIG. 1 schematically illustrates a method for extracting entries according to the teachings herein.
Figure 2:
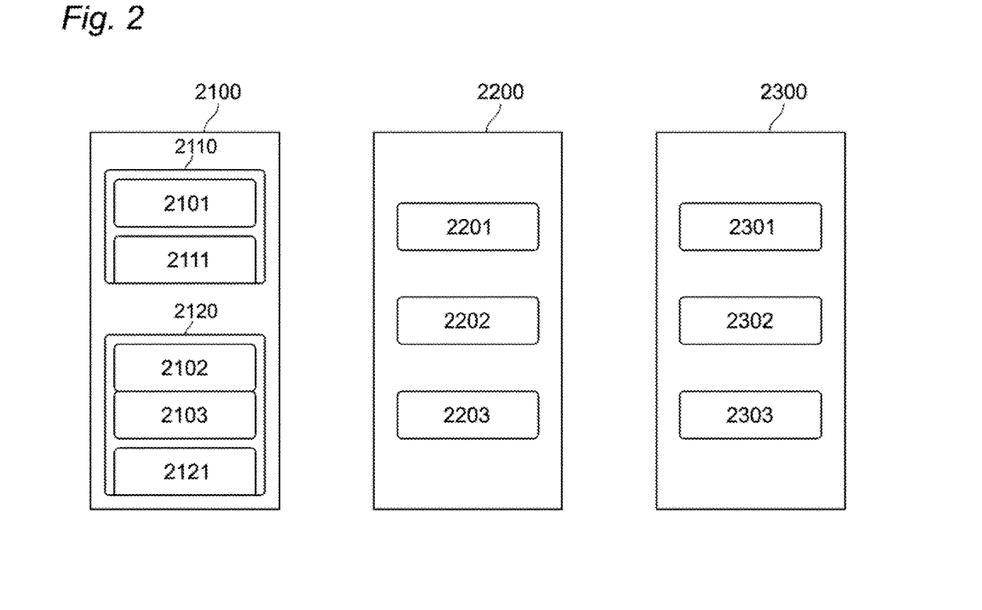
FIG. 2 schematically illustrates a first database, a second database and inputted data according to the teachings herein.

FIG. 1 schematically illustrates a method 1000 for extracting entries according to an embodiment of the teachings disclosed herein. FIG. 2 schematically illustrates a non-limiting exemplary embodiment of a first database 2100, a second database 2200 and inputted data 2300 comprising at least one keyword 2301, 2302, 2303.

In a general implementation, the embodiment relates to a method 1000 for extracting one or more entries among entries 2101, 2102, 2103 stored in the first database 2100. The first database 2100 can be implemented by hardware or software in any known manner. For example, the first database 2100 may be accessible for populating with a user's own data. After population, a first database 2100 generally comprises a plurality of entries 2101, 2102, 2103. One or more entry 2101, 2102, 2103 can comprise a string, or more generally a text file. In some embodiments, one or more entries 2101, 2102, 2103 can be associated to a key 2111, 2121. One or more key 2111, 2121 can comprise a string, or more generally a text file. In some embodiments, one or more entries 2101, 2102, 2103 can share a common key 2111, 2121. In some embodiments, one or more key 2111, 2121 and the respectively associated one or more entries 2101, 2102, 2103 can form a respective first entity 2110, 2120.

In the specifically illustrated example of FIG. 2, the entry 2101 is associated to the key 2111 and together they form first entity 2110. Similarly, the entries 2102 and 2103 are associated to the key 2121 and together they form first entity 2120.

The method 1000 can further comprise a step 1100 of identifying a plurality of second entities 2201, 2202, 2203 from a second database 2200. The second database generally comprise text. In some embodiments, the second database 2200 can comprise a large volume of text. The volume of text may be larger than 40 GB. The large volume of text may be retrieved from the Internet. For example, the second database 2200 can be a text representation of parts of, or the entirety of, the Wikipedia® website, at the address https://www.wikidata.org/. From this text, the identifying step 1100 identifies plurality of second entities 2201, 2202, 2203. One or more second entity 2201, 2202, 2203 can comprise a string, or more generally a text file.

The identifying step 1100 generally consists in parsing the content of the second database and identifying second entities 2201, 2202, 2203. Parsing the content of the second database and identifying the second entities 2201, 2202, 2203 may include filtering according to one or more identification rules. The second entities 2201, 2202, 2203 can be generally be understood as being logical concepts such as "Norton Motorcycles", "Norton Antivirus" and "Norton Edward" which are extracted from the second database 2200 based on a plurality of methods, which will be described in the "identifying method" section afterwards. The specific implementation of the identifying step 1100 is however not limited to the described examples.

The method 1000 can further comprise a step 1200 of inputting data 2300 comprising one or more keywords 2301, 2302, 2303. As an exemplary embodiment, the keywords may be generated by the above-mentioned software and may correspond to keywords which can ensure high traffic and/or high visibility on Internet search engines. In an exemplary embodiment for easier understanding of the teachings, the keywords may be "Café Racer", "Norton" and "Tradition". It will be clear that, in some embodiments, the inputting step 1200 can also be carried out previously to the identifying step 1100.

The method 1000 can further comprise a step 1300 of linking least one keyword 2301, 2302, 2303 of the inputted data 2300 to a linked second entity among the plurality of second entities 2201, 2202, 2203. The linking step may be completed according to one or more linking rules. The linking step can preferably be performed for one keyword 2301, 2302, or 2303 at the time and, eventually by repeating the linking step for a number of times equal to the number of keywords 2301, 2302 and 2303, for all keywords 2301, 2302 and 2303.

The linking step 1300 can generally be performed by any manner in which the at least one keyword 2301, 2302, 2303 is linked to a corresponding linked second entity among the plurality of second entities 2201, 2202, 2203. Different possible specific implementations for the linking step will be discussed in the "linking method" section below. For ease of understanding, an exemplary keyword 2302 can correspond to the string "Norton", and the second entities 2201, 2202, 2203 can correspond to logical concepts such as "Norton Motorcycles", "Norton Antivirus" and "Norton Edward", respectively. Here, the linking step 1300 is capable of linking the keyword 2302 "Norton" to the linked second entity 2201 "Norton Motorcycles".

The method 1000 can further comprise a step 1400 of matching, in the first database 2100, one or more entries 2101, 2102, 2103 based on the linked second entity 2201.

The matching step 1400 can be implemented by matching the linked second entity 2201 to at least one first entity 2110, 2120 of the first database 2100. Alternatively, or in addition, the matching step 1400 can be implemented by matching the linked second entity 2201 to at least one key 2111, 2121 of the first database 2100. Alternatively, or in addition, the matching step 1400 can be implemented by matching the linked second entity 2201 to at least one entry 2101, 2102, 2103 of the first database 2100. The matching can be based on a plurality of method, which will be described in the "matching method" section below. The matching step may be completed according to one or more matching rules. The specific implementation of matching step 1400 is however not limited to the described examples.

The method 1000 can further comprise a step 1500 of extracting the matched entries 2101, 2102, 2103, and/or extracting the entries 2101, 2102, 2103 matched with the at least one matched first entity 2110, 2120, and/or extracting the entries 2101, 2102, 2103 matched with the at least one matched key 2111, 2121.

Thanks to the presence of the second database 2200 it is advantageously possible to use the second entities 2201, 2202, 2203 as a bridge, or as a connecting element, for logically connecting the at least one inputted keyword 2301, 2302, 2303 to one of more of the entries 2101, 2102, 2103. In other words, a direct connection between the at least one inputted keyword and the entries 2101, 2102, 2103 may not always be possible or provide the best results. In the present teachings, by firstly linking the at least one keyword 2301, 2302, 2303 to a linked second entity 2201 and then independently matching the linked second entity 2201 to the one or more entries 2101, 2102, 2103, it is advantageously possible to establish a connection between the at least one keyword 2301, 2302, 2303 and relevant entries 2101, 2102, 2103.

This is further particularly advantageous since the size of the second database 2200 can be selected independently on the first database 2100. In particular, in some embodiments, the number of second entities 2201, 2202, 2203 in the second database can advantageously be larger than the number of first entities 2110, 2120 in the first database. In cases where the inputted keyword 2301, 2302, 2303 may be matched to more than one entry 2101, 2102, 2103, the approach of the present teachings is particularly advantageous as it allows the inputted keyword 2301, 2302, 2303 to firstly be linked to a logically matching second entity 2201, 2202, 2203. As the second entities may be more than the first entity, they allow a better matching to the keyword, thereby fine-tuning the selection of the logical concept corresponding to the inputted keyword 2301, 2302, 2303 and only subsequently using the linked second entity 2201 to match and extract the proper entries 2101, 2102, 2103.

Figure 3:
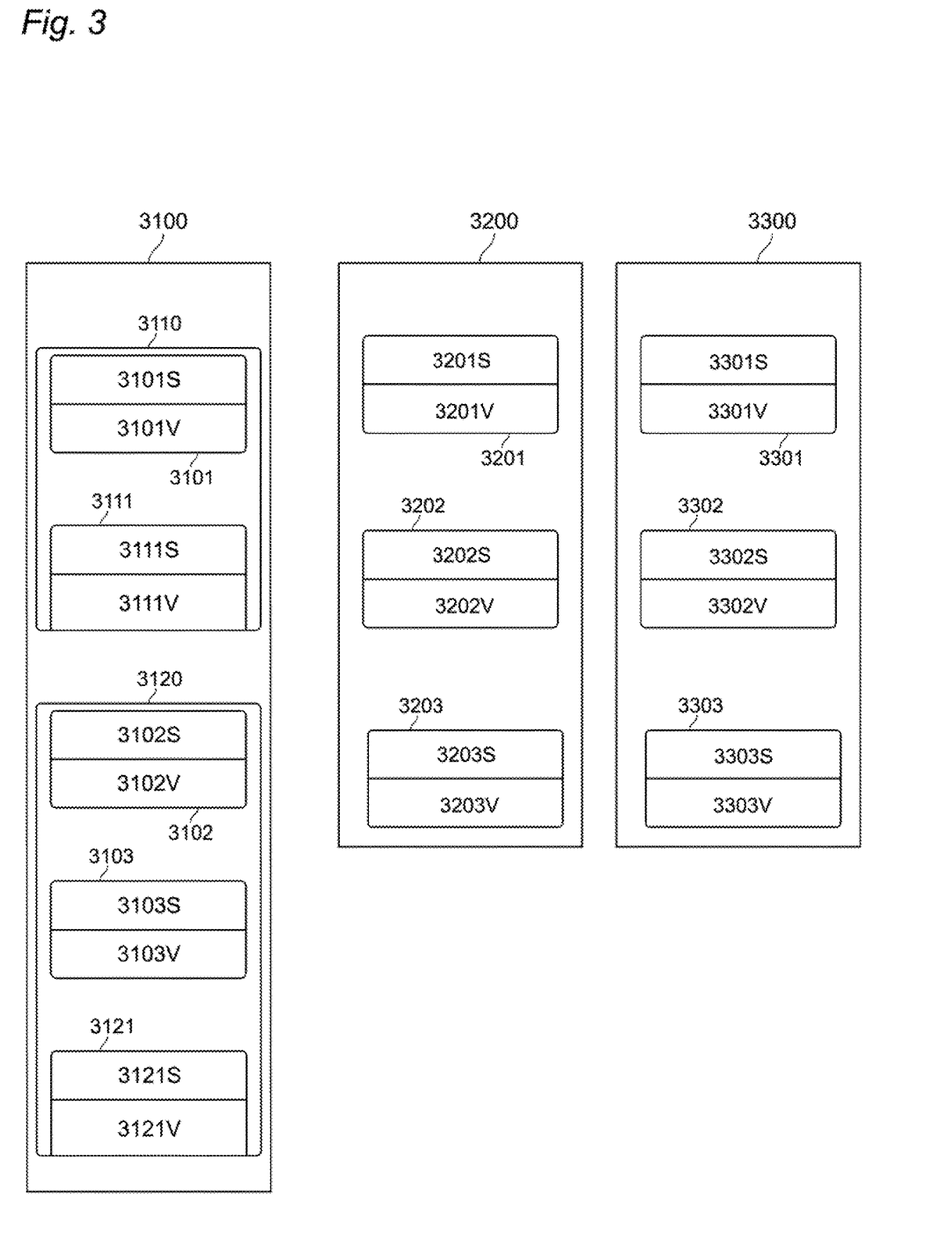
FIG. 3 schematically illustrates a first database, a second database and inputted data according to the teachings herein.

FIG. 3 schematically illustrates a first database 3100, a second database 3200 and inputted data 3300 according to alternative embodiments of the teachings. In particular, the first database 3100 may be substituted to the first database 2100, and/or the second database 3200 may be substituted to the second database 2200 and/or the inputted data 3300 may be substituted to the inputted data 2300.

The first database 3100 can comprise a plurality of entries 3101, 3102 and 3103, at least one of which comprises a string 3101S, 3102S, 3103S and a vector 3101V, 3102V, 3103V, respectively. The string 3101S, 3102S, 3103S can generally be intended as a text file. The vector 3101V, 3102V, 3103V can also generally be intended as a text file. More specifically, the vector 3101V, 3102V, 3103V, can be understood as a vector representation of the respective string 3101S, 3102S, 3103S. The combination of one vector 3101V, 3102V, 3103V and of one string 3101V, 3102V, 3103V can be understood as implementing one possible embodiment of the entry 2101, 2102 and 2103 illustrated in the embodiment of FIG. 2.

Alternatively, or in addition, the first database 3100 can comprise a plurality of keys 3111, 3121, at least one of which comprises a string 3111S, 3121S, and a vector 3111V, 3121V, respectively. The string 3111S, 3121S can generally be intended as a text file. The vector 3111V, 3121V, can also generally be intended as a text file. More specifically, the vector 3111V, 3121V can be a vector representation of the respective string 3111S, 3121S. The combination of one vector 3111V, 3121V, and of one string 3111S, 3121S can be understood as implementing one possible embodiment of the key 2111 and 2121 illustrated in the embodiment of FIG. 2.

As in the case of the embodiment illustrated in FIG. 2, the combination of one entry 3101, 3102, 3013 and one key 3111, 3121 can result in a first entity 3110, 3120. Therefore, for instance the key 3111 comprising the string 3111S and the vector 3111S can form, together with the entry 3010 comprising the string 3101S and the vector 3101S, the entity 3110.

Alternatively, or in addition, the second database 3200 can comprise a plurality of second entities 3201, 3202, 3203, at least one of which comprises a string 3201S, 3202S, 3203S and a vector 3201V, 3202V, 3203V, respectively. The string 3201S, 3202S, 3203S can generally be intended as a text file. The vector 3201V, 3202V, 3203V can also generally be intended as a text file. More specifically, the vector 3201V, 3202V, 3203V, can be a vector representation of the respective string 3201S, 3202S, 3203S. The combination of one vector 3201V, 3202V, 3203V and of one string 3201V, 3202V, 3203V can be understood as implementing one possible embodiment of the second entity 2201, 2202 and 2203 illustrated in the embodiment of FIG. 2.

Alternatively, or in addition, the inputted data 3200 can comprise a plurality of keywords, 3301, 3302, 3303 one or more of which can comprise a string 3301S, 3302S, 3303S and a vector 3301V, 3302V, 3303V, respectively. The string 3301S, 3302S, 3303S can generally be intended as a text file. The vector 3301V, 3302V, 3303V can also generally be intended as a text file. More specifically, the vector 3301V, 3302V, 3303V, can be a vector representation of the respective string 3301S, 3302S, 3303S. The combination of one vector 3301V, 3302V, 3303V and of one string 3301V, 3302V, 3303V can be understood as implementing one possible embodiment of the keyword 2301, 2302 and 2303 illustrated in the embodiment of FIG. 2.

It will be clear that the above-described options can be combined in any possible way. Therefore, for instance, there may be embodiments in which only the entries comprise a string and a vector while the key, the second entity and the keywords don't. As an alternative example, it is possible that all elements, namely the entries, the keys, the second entity and the keywords may each comprise a string and a vector. More generally, it will be clear that all possible combinations of the above options can result in embodiments of the present teachings.

Any of the vectors described above can be generated with any known manner for obtaining a vector representation of a respective string. A preferred manner consists in the Word2vec method, described for instance at http://multi-threaded.stitchfix.com/blog/2015/03/11/word-is-worth-a-thousand-vectors/ and which is herewith incorporated by reference.

In the latter case, the Word2vec may use a single text corpus for obtaining the vector representation of the various strings, for instance the content of the second database 3200 can be used as a single corpus. Alternatively, or in addition, a separate corpus may be used for the vectors in the first database 3100, for the vectors in the second database 3200 and for the vectors in the inputted data 3300. In the latter case, for instance, the first database 3100 may be used as corpus for the vectors in the first database 3100, the second database 3200 may be used as corpus for the vectors in the second database 3200 and the inputted data 3300 may be used as corpus for the vectors in the inputted data 3300.

Figure 4:
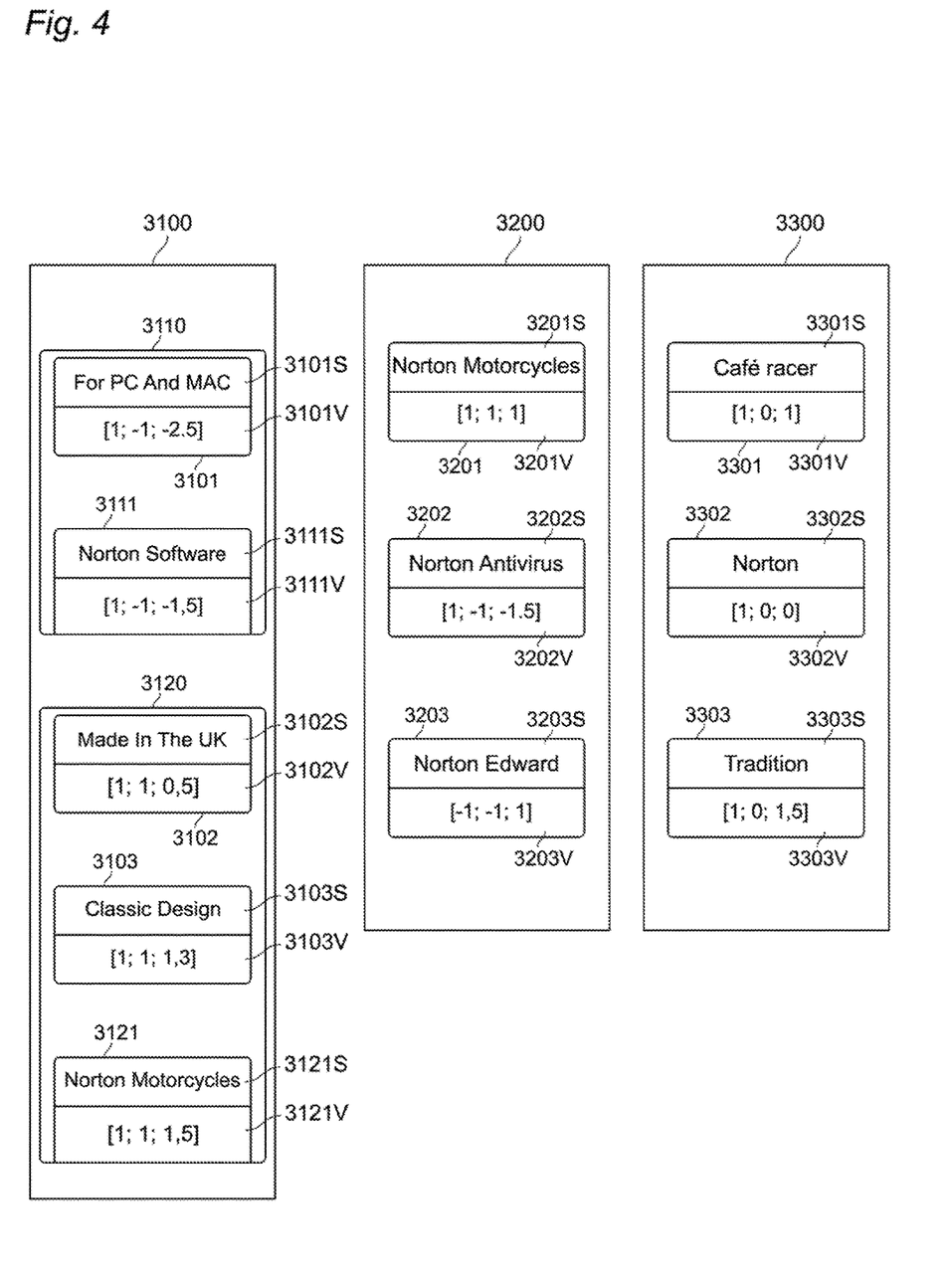
FIG. 4 schematically illustrates exemplary data within the first database, of the second database and of the inputted data according to the teachings herein.

FIG. 4 schematically illustrates an exemplary embodiment of the first database 3100, of the second database 3200 and of the inputted data 3300 in the case where all elements, namely the entries 3101, 3102, 3103, the keys 3111, 3121, the second entity 3201, 3202, 3203 and the keywords 3301, 3302, 3303 each comprise a respective string and vector.

For illustrative purposes, the vectors have all been represented by using a vector having a length of three. This has only been done to allow a simpler graphical representation for ease of understanding of the teachings. It will be clear, however, that the teachings can be implemented by choosing vectors of any length and, preferably, longer than 3 elements, more preferably longer than 30 elements, even more preferably longer than 70 elements, for instance 100 elements. It will further be clear that, by increasing the number of elements in the vectors, the method 1000 generally improves in precision.

The exemplary values for the various strings and vectors will not be repeated in the description as they are clearly visible in the drawing. As an example, string 3201S corresponds to "Norton Motorcycles" while the corresponding vector 3201V corresponds to [1; 1; 1].

Figure 5:
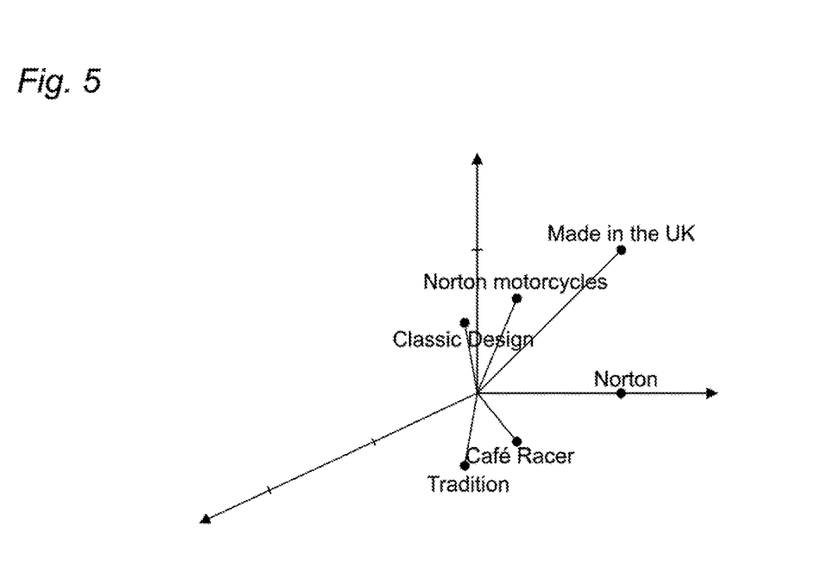
FIG. 5 schematically illustrates a vector representation of the exemplary data illustrated in FIG. 4.

FIG. 5 schematically illustrates a vector representation of the exemplary embodiment illustrated in FIG. 4. For ease of representation, only some of the elements of the exemplary embodiment of FIG. 4 are illustrated in FIG. 5. Having selected, for ease of representation, a length of the vectors equal to three, it is possible to represent the various elements in a three-dimensional space comprising axes A1, A2 and A3 related to the three values, in order, of each vector.

As can be seen in FIG. 5, the vector representation provides a space representation of the logical concepts represented by the various strings. In the multidimensional space, two vectors which are near to each other relate to similar or interrelated concepts. Moreover, when starting from two points in space corresponding to two different vectors, moving along a given direction from each vector relates to apply a similar logical concept to each vector.

Going back to the original example, a content creator may receive a keyword such as "Norton", here represented by string 3202S. The user may want to know what the keyword "Norton" means and, to do so, the method 1000 may be used to extract from the first database 3100 entries relevant to the keyword "Norton".

A simple search in the first database 3100 by using "Norton" or "Norton*" as query and each of the keys of the first database 3100 as keys would not be successful as this would result in the extraction of "Norton Software" and of "Norton Motorcycles", and the respective entries, which are two non-related concepts and do not help the content creator in understanding what the term "Norton" means in the field of "café racer" articles.

In those embodiments in which the keys 3111, 3121 and the keywords 3301, 3302, 3303 are provided with a vector representation, one further possibility would be to compute a distance between the vector 3302V for the keyword "Norton" and the vectors 3111V and 3121V of the keys 3111 and 3121 of the first database 3100 and then selecting the key which has the least distant vector from the keyword. In this exemplary case the same distance would be computed between vector 3302V [1; 0; 0] and each of vectors 3111V [1; −1; −1,5] and 3121V [1; 1; 1,5]. Thus, the ambiguity could not be solved by referring to the first database 3100 alone.

However, by using the second database 3200, a linking step 1300 can advantageously be performed between the keyword 3302 comprising the string 3302S "Norton" and the vector 3302V [1; 0; 0] and between the second entities 3201, 3202, 3203 of the second database 3200. The linking step 1300 may consist in a vector distance calculation as previously described. In this case, the closest vector among those of the second entities would be vector 3201V corresponding to the second entity 3201 comprising the string 3201S "Norton Motorcycles". It should be noted that a simple keyword matching between the string 3302S and the strings 3201S, 3202S and 3303S would have been ambiguous, as the term "Norton" appears in all three strings. However, by using a vector distance approach, it is possible to link the keyword 3202 comprising the string 3202S "Norton" to the second entity 3201 comprising the string 3201S "Norton Motorcycles" and the string 3201V. In this sense, the second database 3200 allows a finer tuning of the keyword to a logical concept or second entity 3201, 3202, 3203. The finely-selected second entity 3201, 3202, 3203 can then be used to resolve the ambiguous choice of key, entity or entries from the first database 3100.

The subsequent matching step 1400 allows the linked second entity 3201 to be matched to the key 3121 comprising the vector 3121V, as this is closer than the vector 3111V. The subsequent extracting step 1500 can then return the string 3102S and/or 3103S as they are both associated with the match keyword.

As will be described later, the matching step can also be performed between the linked second entity 3201 and the entries 3101, 3102, 3103 of the first database, or only to the entries 3102, 3103 of the matched keyword 3121. This allows, in some embodiments, to match the most relevant entries among a potentially high number of entries associated to a single key.

In the above examples it can be seen how the presence of the second database 3200 and of the second entities allows an extraction of relevant entries from the first database 3100 based on inputted data 3300 which would not otherwise be possible without the second database 3200.

It will be understood that this is only one possible exemplary embodiment of the application, as a plurality of combinational implementations for the first database 3100, the second database 3200 and the inputted data 3300 have been described above, and a plurality of combinational implementations for the methods for the linking step 1300 and/or for the matching step 1400 and/or for the identifying step 1100 will be further described below.

All these possible embodiments can be combined in different embodiments of the teachings as disclosed herein.

Identifying Method

Here a plurality of possible methods for the implementation of the identifying step 1100 will be discussed. Generally, the identifying step 1100 allows to start from a large amount of text and identify logical entities, such as people, places, objects, companies, events, while discarding words which do not represent a logical entity, such as articles, adverbs, numbers, etc. There are several known methods for achieving such results which can be implemented, all of which can be used in order to implement the identifying step 1100. The identification step 1100 may include obtaining one or more identification rules, evaluating the large amount of text against a set of identification rules, discarding text identified by one or more identification rules, or any combination thereof. The evaluating and/or discarding may be referred to as filtering. A set of identification rules may define one or more words to be discarded from the large amount of text, such as words which do not represent a logical entity, such as articles, adverbs, numbers, etc. Identification rules may include named-entity recognition (also referred to as a named-entity recognition filter), entity annotation, entity disambiguation (also referred to as one or more disambiguation rules), entity to vector, or any combination thereof. The one or more identification rules may be stored on a same or differing non-transient storage device as the first and/or the second database.

Figure 6:
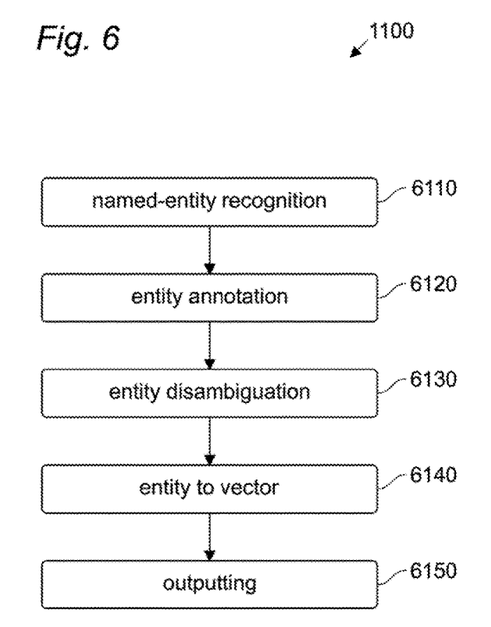
FIG. 6 schematically illustrates an identifying step according to the teachings herein.

FIG. 6 schematically illustrates an identifying step 6100 according to an embodiment of the teachings. The identifying step 6100 can be one possible implementation of identifying step 1100. As will be discussed in the following, although for ease of representation the identifying step 6100 is illustrated as comprising five sub-steps 6110-6150, the identifying step 6110 may be realized by implementing only a subset of those steps, such as steps 6110, 6140 and 6150. Some or all of the remaining steps, such as steps 6120 and 6130 may be implemented only in some additional embodiments.

In some embodiments, the identifying step 6100 can comprise a step 6110 of named-entity recognition for filtering the entities of the second database 2200 by recognizing named entities within the second database 2200. An example of a named-entity recognition method can be found at https://www.wikiwand.com/en/Named-entity_recognition, the content of which is herewith incorporated by reference. Following the named-entity recognition step 6110, the content of the second database 2200, 3200 comprises a plurality of named entities, which have been isolated from the original content of the second database 2200, 3200. Moreover, in those cases where the second database 2200, 3200 corresponds to Wikipedia (ID articles, it will be possible to associate the named entities to the URL of the article in which they have been identified.

As this point, in some embodiments, it is possible to create a keyword to entity dictionary. The keyword to entity dictionary can be created by recognizing the keywords in the above-mentioned URL and associating them to the entities associated to the URL. As an example, in the Wikipedia® page corresponding to the URL https://en.wikipedia.org/wiki/Norton_Motorcycle_Company it is possible to extract the keyword "Norton Motorcycle Company" by selecting the string after the last backslash. This keyword can be saved in association with the entities recognized in the page corresponding to the URL after it has been processed by the named-entity recognition step 6110.

The identifying step 6100 can further comprise a step 6140 of entity to vector for representing, in a vector form, each of the recognized named entities. This can be achieved by applying the above-mentioned Word2vec method or any method which can calculate a vector representation of a string corresponding to a named entity.

The identifying step 6100 can further comprise a step 6150 of outputting the result of the entity to vector step 6140 as the second entities 2201, 2202, 2203, 3201, 3202, 3203.

In some embodiments, the identifying step 6100 can further comprise, between the named-entity recognition step 6110 and the outputting step 6150, the step 6120 of entity annotation for annotating a content of the second database 2200, 3200 based on the results of the named-entity recognition step 6110. In particular, each named entity recognized in the named-entity recognition step 6110 can be annotated to as to be associated to a logical entity. This can be achieved, for instance, by using tags to tag the various recognized named entities.

In some embodiments, the identifying step 6100 can further comprise, after the entity annotation step 6120, an entity disambiguation step 6130 for disambiguating at least one ambiguous named entity, from the second database 2200, 3200, which can be linked to a plurality of logical entities. The disambiguating may be completed according to one or more disambiguation rules. For instance, the keyword "Norton" can be recognized as a named entity and can be associated to three already recognized entities, namely "Norton Motorcycles", "Norton Edward" and "Norton Antivirus". In order to determine which already recognized logical entity should be associated to the named entity "Norton" in this specific context, several possible approaches (e.g., disambiguation rules) are possible.

Figure 7:
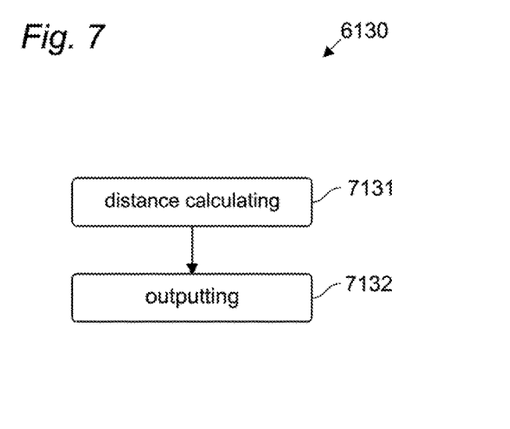
FIG. 7 schematically illustrates a method for extracting entries according to an the teachings herein.

For instance it can be possible to select the logical entity which is most common in the URL under consideration. Or the most common in the second database 2200, 3200. Alternatively, the entity disambiguation step 6130 can comprises a distance calculating step 7131 of calculating a distance between the at least one ambiguous named entity and each of the plurality of already recognized named entities close to the ambiguous named entity. Here, the term "close" can be interpreted as selecting a predetermined number of already recognized named entities preceding and/or following the ambiguous named entity. The predetermined number can be 1 or more, preferably 3 or more, even more preferably 5 or more.

For each possible logical entity which can be associated to the ambiguous named entity, the distance between the vector representation of the logical entity and each of the close already recognized entities is computed and added together. The logical entity which results in the smallest added amount is selected as logical entity for the ambiguous named entity.

FIG. 7 illustrates the entity disambiguation step 6130 may further comprise an outputting step 7132 of outputting the one of the plurality of recognized named entities corresponding to a smallest distance among those calculated in the distance calculating step 7131, or, said otherwise, corresponding to the smallest added amount as described above.

Thanks to the various alternatives described above it is possible to obtain a second database 2200, 3200 in which a plurality of second entities 2201-2203, 3201-3203 are recognized and represented by a string and/or a vector representation.

Linking Method

Here a plurality of possible methods for the implementation of the linking step 1300 will be discussed.

In some embodiments, the linking step 1300 comprises linking the at least one keyword 2301-2303, 3301-3303 to a second entity 2201-2203, 3201-3203 which comprises at least a part of the keyword. This is particularly advantageous in those cases where the keyword and/or the second entity do not have a vector representation, such as the embodiment illustrated in FIG. 2. The linking step 1300 may include obtaining one or more linking rules; evaluating text, strings of text, vectors, and/or with one or more linking rules; linking one or more keywords to one more second entities according to one or more linking rules; or any combination thereof. One or more linking rules may define based on text, strings of text, and/or vectors if at least a portion of or an entire amount of a keyword is present within the text, strings of text, and/or vectors; may compare a string of second entities to a keyword; may determine a string of text which has a highest string matching a keyword; determine a distance of one or more second entities in vector form to one or more keywords in vector form; determine proximity (i.e., distance) of one or more vectors to one or more other vectors; the like; or any combination thereof. The one or more linking rules may be stored on same or differing non-transient storage device as the first and/or the second database.

For example, linking may be based on a string correspondence among the keyword and the second entity wherein the keyword is linked to the second entity if a predetermined amount of the keyword is present in the string representation of the second entity. The predetermined amount can be at least 60% or more of the keyword, at least 70% or more of the keyword, or even 80% or more of the keyword. The predetermined amount can be 100% or less of the keyword, 95% or less of the keyword, or even 90% or less of the keyword.

Alternatively, or in addition, the string of the keyword is compared to the string of all second entities and the keyword is associated to the second entity which has the highest string matching to the keyword.

In some alternative embodiments, or in addition, in particular when the keyword and the second entity are provided with a vector representation such as in the embodiments of FIG. 3, it is possible to link the keyword to the second entity, among all second entities in the second database 3200, which has the smallest vector distance from the vector representation of the keyword.

In some mixed embodiments it will be possible to combine the above methods. For instance it can be possible to first select a number of second entities based on a string matching and then refine the selection based on a vector computation distance, or the other way around.

In some further embodiments both methods can be performed at the same time. A predetermined number of the top-results from one method can be compared to a predetermined number of the top-results from the other method and the final second entity can be selected as the one present in both sets of top results.

Matching Method

Here a plurality of possible methods for the implementation of the matching step 1400 will be discussed.

In some embodiments, the matching step 1400 comprises linking and/or matching the linked second entity to one first entity and/or one key and/or one entry which comprises at least a part of the keyword. This is particularly advantageous in those cases where the keyword and/or the second entity do not have a vector representation, such as the embodiment illustrated in FIG. 2. The matching step may include obtaining one or more matching rules and/or evaluating, matching, calculating, sorting, and/or outputting one or more entities from one or more databases based on the one or more matching rules. Matching according to the one or more matching rules may include matching one more linked second entities to one or more first entities, keys, and/or entries which may be part of a keyword based on one or more matching rules; on thereof. Calculating according to the one more matching rules may include calculating vector distances between one or more second entities and one or more first entities. Sorting via the one or more matching rules may include sorting and/or ranking one or more calculated vector distances. Outputting according to the one or more matching rules may include outputting one or more first and/or second entities. The one or more matching rules may be stored on same or differing non-transient storage device as the first and/or the second database.

For example, the linking is based on a string correspondence among the keyword and the second entity wherein the keyword is linked to the second entity if a predetermined amount of the keyword is present in the string representation of the second entity. The predetermined amount can be at least 60% or more of the keyword, at least 70% or more of the keyword, or even 80% or more of the keyword. The predetermined amount can be 100% or less of the keyword, 95% or less of the keyword, or even 90% or less of the keyword.

Alternatively, or in addition, the string of the keyword is compared to the string of all second entities and the keyword is associated to the second entity which has the highest string matching to the keyword.

In some alternative embodiments, in particular when the keyword and the second entity are provided with a vector representation such as in the embodiments of FIG. 3, it is possible to link the keyword to the second entity, among all second entities in the second database 3200, which has the smallest vector distance from the vector representation of the keyword.

In some mixed embodiments it will be possible to combine the above methods. For instance it can be possible to first select a number of second entities based on a string matching and then refine the selection based on a vector computation distance, or the other way around.

In some further embodiments both methods can be performed at the same time. A predetermined number of the top-results from one method can be compared to a predetermined number of the top-results from the other method and the final second entity can be selected as the one present in both sets of top results.

In some embodiments, the matching step 1400 can comprise calculating a distance between the linked second entity 2201 and the entries 2101, 2102, 2103, ranking the entities in descending order based on their distance from with respect to the linked second entity and returning a predetermined number of entities from the one with the smallest distance downward. The predetermined number can be chosen by the user of the method 1000.

In all of the above examples, the distance between two vectors can be computed by a cosine distance calculation. Calculations, such as a cosine distance calculation, for determining a distance between vectors can be found in "Mining of Massive Datasets", second edition, by Jure Leskovec, Anand Rajaraman, and Jeffrey David Ullman as published in 2014 by Cambridge University Press and "Natural Language Understanding and Intelligent Applications" by Chin-Yew Lin, Nianwen Xue, Dongyan Zhao, Xuanjing Huang, Yansong Feng as published in 2016 by Springer are incorporated herein by reference.

LIST OF REFERENCE NUMERALS

1000: method for extracting entries
1100: identifying step
1200: inputting step
1300: linking step
1400: matching step
1500: extracting step
2100: first database
2101, 2102, 2103: entry
2110, 2120: first entity
2111, 2121: key
2200: second database
2201, 2202, 2203: second entity
2300: inputted data
2301, 2302, 2303: keyword
3100: first database
3101, 3102, 3103: entry
3101S, 3102S, 3103S: entry string
3101V, 3102V, 3103V: entry vector
3110, 3120: first entity
3111, 3121: key
3111S, 3121S: key string
3111S, 3121S: key vector
3200: second database
3201, 3202, 3203: second entity
3201S, 3202S, 3203S: second entity string
3201V, 3202V, 3203V: second entity vector
3300: inputted data
3301, 3302, 3303: keyword
3301S, 3302S, 3303S: keyword string
3301V, 3302V, 3303V: keyword vector
6110: named-entity recognition step
6120: entity annotation step
6130: entity disambiguation step
6140: entity to vector step
6150: outputting step
7131: distance calculating step
7132: outputting step Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A computer-implemented method for creating and editing content of a website to be ranked higher by one or more search engines by extracting one or more matched entries from a first database using a second database comprising the steps of:
    (a) identifying a plurality of second entities from the second database by filtering a plurality of entities of the second database according to one or more identification rules by one or more processors,
        wherein the second database is:
        (i) stored within one or more non-transient storage devices;
        (ii) a text representation of at least part of an Internet-based encyclopedia;
        wherein the one or more identification rules comprise:
        (i) filtering the plurality of entities of the second database according to a named-entity recognition filter to recognize and isolate named entities within the second database;
        (ii) calculating a vector form of each of the named entities; and
        (iii) outputting the vector form of each of the named entities as the plurality of second entities;
    (b) inputting into one or more user interfaces by a user at least one keyword which is related to the content of the web site as a query to extract the one or more matched entries from the first database, wherein the first database is:
        (i) stored within the one or more non-transient storage devices;
        (ii) is smaller than the second database; and
        (iii) includes one or more text files related to goods, services, or clients of the user;
    (c) automatically linking the at least one keyword to one or more second entities by the one or more processors according to one or more linking rules to define one or more linked second entities, wherein:
        i) the at least one keyword is related to the content of the website;
        ii) the one or more linking rules comprise linking the at least one keyword to one or more linked entities which comprise at least a part of the at least one keyword; and
        iii) the part of the at least one keyword is between 60% or more of a length of the keyword and 100% or less of the length of the keyword;
        wherein the one or more linking rules include calculating how much of a portion of the at least one keyword is present in the one or more second entities, a vector distance between a vector representation of the at least one keyword and the one or more second entities, or both;
        wherein the one or more linking rules specify a predetermined quantity the portion of the at least one keyword which must be present in the one or more second entities to link the at least one keyword with the one or more linked second entities;
    (d) automatically matching the one or more linked second entities to one or more entries in the first database by the one or more processors according to one or more matching rules to define the one or more matched entries;
    (e) automatically extracting the one or more matched entries from the first database by the one or more processors; and
    (f) creating and editing the content of the website by the user by including the one or more matched entries on the website so that the webpage will become more relevant according to the one or more keywords and will be ranked higher by the one or more search engines to attract traffic to the website.

2. The method according to claim 1, wherein the second database comprises a volume of text equal to or larger than 40 GB.

3. The method according to claim 2, wherein the volume of text is retrieved from the Internet.

4. The method according to claim 1, wherein the one or more entries, the plurality of second entities, and/or the at least one keyword comprise a string and a vector.

5. The method according to claim 1, wherein the one or more identification rules further comprise, between the filtering the plurality of entities and the outputting:
    annotating one or more of the named entities of the second database to associate the named entities with one or more logical entities; and
    disambiguating at least one of the entities of the second database which are ambiguous according to one or more disambiguation rules.

6. The method according to claim 5, wherein the one or more disambiguation rules comprise:
    calculating a cosine distance between at least one ambiguous named entity and each of the plurality of recognized named entities close to the ambiguous named entity,
    outputting one of the plurality of recognized named entities corresponding to a smallest distance among those calculated in the calculating step.

7. The method according to claim 1, wherein the part of the at least one keyword is between 80% or more of the length of the keyword and 100% or less of the length of the keyword.

8. The method according to claim 1, wherein the one or more matching rules comprise calculating a distance between the one or more linked second entities and the one or more entries.

9. The method according to claim 1, wherein the one or more identification rules include evaluating text within the second database to identify one or more logical entities within the text and discarding text which does not represent the one or more logical entities.

10. The method according to claim 1, wherein the method includes a step of populating the first database with the one or more entries by the user.

11. The method according to claim 1, wherein the method includes initiating population of the second database with a plurality of entries from the Internet-based encyclopedia.

12. A computer-implemented method for creating and editing content of a website to be ranked higher by one or more search engines by extracting one or more matched entries from a first database using a second database comprising the steps of:
  a) providing a first database and a second database, each populated with a plurality of entities, wherein the first database and the second database reside within one or more non-transient storage devices, wherein the first database includes text files of information related to goods, services, or clients of a user, and wherein the second database is a text representation of at least part of an Internet-based encyclopedia;
  b) based upon user input via one or more user interfaces by the user in communication with the first database and the second database, automatically generating a plurality of identified second entities by one or more processors by filtering the entities of the second database according to one or more identification rules, wherein the identification rules comprise:
    i) filtering the plurality of entities of the second database according to a named-entity recognition filter to recognize and isolate named entities within the second database;
    (ii) calculating a vector form of each of the named entities; and
    (iii) outputting the vector form of each of the named entities as the plurality of second entities;
  c) automatically evaluating by the one or more processors one or more keywords inputted by the user into the one or more user interfaces and the plurality of identified second entities according to one or more linking rules to filter the plurality of identified second entities and define a plurality of linked second entities, wherein the one or more keywords are related to content of a website, and wherein the one or more linking rules include:
    (i) calculating a plurality of vector distances between a vector representation of the one or more keywords and the plurality of identified second entities;
    (ii) sorting the plurality of vector distances;
    (iii) selecting an individual vector distance which is the smallest from the plurality of vector distances; and
    (iv) linking the one or more keywords and an identified second entity associated with the individual vector distance;
  d) automatically generating one or more matched entries with the one or more processors by applying one or more matching rules to the plurality of linked second entities and matching with one or more entries of the first database;
  e) automatically extracting the matched one or more entries by the one or more processors; and
  f) creating and editing the content of the website by the user by including the one or more matched entries on the website so that the webpage will become more relevant according to the one or more keywords and will be ranked higher by the one or more search engines to attract traffic to the website.

13. The method of claim 12, wherein the one or more linking rules include calculating how much of a portion of the one or more keywords is present in one or more of the plurality of identified second entities;
  wherein the one or more linking rules include linking the one or more keywords to one or more of the identified second entities if the portion of the one or more keywords is between 60% to 100% of the one or more keywords.

14. The method of claim 12, wherein the one or more matching rules include:
  calculating a plurality of vector distances between a vector representation of the plurality of linked second entities and the one or more entries of the first database;
  sorting the plurality of vector distances;
  selecting an individual vector distance which is the smallest from the plurality of vector distances; and
  linking the one or more entries of the first database and a linked second entity associated with the individual vector distance.

15. The method according to claim 12, wherein the second database comprises a volume of text equal to or larger than 40 GB.

16. The method according to claim 12, wherein the method includes initiating population of the second database with a plurality of entries from the Internet-based encyclopedia.

* * * * *